United States Patent
Clark

(10) Patent No.: US 6,391,980 B1
(45) Date of Patent: May 21, 2002

(54) ACTIVATED AND CONJUGATED POLYSTYRENE SUBSTRATE

(75) Inventor: Brian Clark, Redwood City, CA (US)

(73) Assignee: Aventis Pharmaceuticals Products, Inc., Bridgewater, NJ (US)

( * ) Notice: Subject to any disclaimer, the term of this patent is extended or adjusted under 35 U.S.C. 154(b) by 0 days.

(21) Appl. No.: 08/476,980

(22) Filed: Jun. 7, 1995

Related U.S. Application Data

(60) Continuation of application No. 07/970,303, filed on Nov. 2, 1992, now Pat. No. 5,484,852, which is a division of application No. 07/051,917, filed on May 19, 1987, now Pat. No. 5,241,012.

(51) Int. Cl.[7] .................................................. C08F 8/30
(52) U.S. Cl. .................................................. 525/333.6
(58) Field of Search ........................... 525/333.3, 333.6, 525/338, 339

(56) References Cited

U.S. PATENT DOCUMENTS

| | | | |
|---|---|---|---|
| 2,592,349 A | 4/1952 | Skogseid | ..................... 526/311 |
| 3,761,299 A | 9/1973 | Lidel | |
| 3,817,837 A | 6/1974 | Rubenstein | |
| 3,860,486 A | 1/1975 | Keyes et al. | |
| 3,956,219 A | 5/1976 | Smithwick et al. | |
| 3,974,110 A | 8/1976 | Patchornik et al. | |
| 3,981,775 A | * 9/1976 | Kenyon | ..................... 435/181 |
| 3,995,094 A | 11/1976 | Crosby et al. | |
| 4,151,049 A | * 4/1979 | Janata | |
| 4,217,338 A | 8/1980 | Quash | |
| 4,226,958 A | 10/1980 | Smith et al. | |
| 4,419,444 A | 12/1983 | Quach | |
| 4,767,706 A | * 8/1988 | Levesque | ..................... 435/176 |
| 4,933,410 A | * 6/1990 | Okrongly | |

OTHER PUBLICATIONS

Olah, et al., *J. Am. Chem. Soc.*, 84:3687 (1962).

* cited by examiner

*Primary Examiner*—Christopher Henderson
(74) *Attorney, Agent, or Firm*—Morrison & Foerster LLP

(57) ABSTRACT

Solid substrates and methods for their preparation are provided, where enhanced functionalization of solid substrates is achieved, so that higher levels of binding of a wide variety of moieties can be obtained. The surface is nitrated with a nitronium agent, where the nitro groups may be modified in a variety of ways to serve as sites for linking. The resulting solid substrates find use in therapy, diagnosis and processing.

7 Claims, No Drawings

ACTIVATED AND CONJUGATED POLYSTYRENE SUBSTRATE

This application is a continuation of U.S. Ser. No. 07/970,303 filed Nov. 2. 1992 and now U.S. Pat. No. 5,484,852, which is a divisional of U.S. Ser. No. 07/051,917, filed May 19. 1987 and now U.S. Pat. No. 5,241,012.

TECHNICAL FILED

Novel highly functionalized solid substrates are provided in conjunction with methods for their preparation and conjugation of the functionalities to a wide variety of compositions. The subject articles find extensive use in diagnosis, therapy, processing, as well as other applications, where binding of a particular moiety to a solid surface is desired.

BACKGROUND

Solid surfaces play a significant role in the ability to separate a component from a mixture of components, to localize one or more moieties to a specific area, to investigate characteristics of various molecules, molecular aggregations, cells or tissue, or in other situations where having a moiety in a defined region, optionally in relation to a particular medium, is of interest. Thus, solid substrates find application in diagnostics, for haptens, antigens and nucleic acids, affinity chromatography, apheresis, cytophoresis as well as other applications. There are many characteristics of interest with the solid substrate, such as degree of non-specific binding, clarity, ease of fabrication, availability, etc. The characteristics are of varying importance, depending upon the particular application. For purposes of the subject invention essential characteristics include the ease with which functionalities may be introduced, the convenience of such functionalties for linking other groups, the interaction between such functionalities and the moieties attached to such functionalities, the density of functionalization available for linkage, reproducibility of the functionalization and the methods employed for linkage. There is also an interest in being able to easily view the contents of a container, such as a bottle or flask.

In many situations, it is highly desirable to have a high density of a particular moiety on the surface. By having a high density a greater number of interactions can be achieved in a predetermined surface area. This allows for smaller volumes to be used, shorter contact times, greater intensity of signal, as well as other advantages.

There is, therefore, a continuing interest in being able to develop new methods and compositions which allow for improvements of solid substrates. Such improvements can have affects on the sensitivity and efficiency of diagnostic assays, the efficiency of separation of components in a complex mixture, the ability to pack particular moieties into a small surface area, as well as other improvements.

Relevant Literature

Olah et al., *J. Am. Chem. Soc.* (1962) 84:3687 reports nitration in tetramethylenesulfone. Functionalization of polystyrene is described in U.S. Pat. Nos. 3,956,219; 3,886,486; 3,974,110; 3,995,094; and 4,226,958. Linking through a Schiff's base to a solid support is described in U.S. Pat. Nos. 4,419,444 and 4,217,338.

SUMMARY OF THE INVENTION

Novel functionalized solid substrates comprising addition polymerized aromatic monomers are provided. The novel substrates are polynitrilo substituted substrates produced by nitration of the aromatic polymer surface by an electrophilic agent, particularly a nitrating agent, in a solvent substantially incapable of dissolving the polymer, containing a small amount of a polar coordinating agent. A high proportion of the aromatic groups are substituted with nitro groups. The nitro groups may then be reduced to nitrilo groups, particularly amino groups or other reduced nitrogen groups which may serve as a site for linking to a wide variety of molecules. The resulting solid substrates find particular use for separations or high density packing of a moiety of interest.

DESCRIPTION OF THE SPECIFIC EMBODIMENTS

Novel functionalized aromatic substrates are provided, where substantially the entire surface of a solid aromatic substrate is functionalized. Highly functionalized surfaces are achieved employing electrophilic agents capable of aromatic electrophilic substitution, particularly a nitrating agent, and a solvent which is relatively non-polar and in which the polymer is substantially immiscible and not swelled. Included in the reaction medium is a small amount of a polar substance, particularly a hydroxylic compound, which can coordinate with the electrophilic agent.

The solid substrate will be a homo- or co-polymer, usually non-cross-linked or having a low level of cross-links (<2.0% polyene monomer) wherein at least 50 mol %, more usually at least about 80 mol % will be aromatic addition polymerizable hydrocarbon monomers, particularly having aryl groups of from 1 to 3 rings and having from 0 to 1 alkyl substituents, from 1 to 3 carbon atoms, usually at other than the para-position. For the most part, the substrate will be polystyrene which is produced in accordance with conventional ways and appears in a variety of forms, such as vials, microtiter plates, Petri dishes, plates, containers, fabricated articles, and the like. Instead of containers, the solid substrate may be particles, hollow fibers, strands, chopped strands, membranes, or the like. The polymer may be molded, extruded, machined or the like, usually resulting in a clear relatively smooth surfaces For the most part, electrophilic agents are employed, particularly nitrating agents, where the nitronium ion is coordinated with an anion which allows for significant ionization in the solvent medium, particularly a complex anion, more particularly a polyhalide anion. Illustrative polyhalide anions include tetrafluoroborate, antimony hexafluoride, phosphorous hexafluoride, etc.

The solvent will be one in which the polymer is neither soluble nor swelled, particularly tetramethylenesulfone (TMS). Included in the solvent will be a polar coordinating compound, which is able to coordinate with a nitronium ion. Conveniently, water may be used, but other oxy compounds may also find use, such as methanol. The polar compound should be capable of displacing both the anion and the solvent from coordination with the nitronium ion. The polar component will preferably be present in not greater than about equimolar amount to the nitronium ion concentration, usually present in at least about 0.05, more usually in at least about 0.25, and generally at least about 0.5 times the molar concentration of nitronium ion.

The nitronium ion will generally be at a concentration of at least about 0.05 M, usually at least about 0.1 M, and usually not greater than about 0.8 M. The particular concentration is primarily one of convenience, so long as there is a sufficient amount of reactant to substantially completely functionalize the polymeric surface.

The temperature of the reaction will vary with the nature of the reagent, generally being at least about 4° C., and not more than about 60° C., usually not more than about 40° C., preferably ranging from about 30° C. to 40° C. The time for the reaction will vary with the temperature, so that longer times will be related to lower temperatures. Generally, the reaction will take at least 1 hr, and not more than about 48 hrs, generally running from about 2 to 24 hrs.

The reaction medium is contacted with the polymeric surface to provide an amount of reactant stoichiometric with the available aromatic groups at the surface, usually at least about 1.5 excess, where greater molar excess may be employed as convenient. In some instances it may be desirable to prepare a number of reaction mixtures using differing amounts of nitronium ion to optimize the level of functionalization of the surface.

After completion of the reaction, the reaction mixture may be discarded and the surface washed to remove any residual materials. Various solvents may be used for cleaning the surface, such as methanol, ethanol, dimethylsulfoxide (DMSO), water, nitromethane or the like. The particular material employed for cleaning is not critical to this invention and is primarily one of convenience, so long at the polymer is insoluble and is not swelled by the solvent.

The resulting polymeric surface is found by electron spectroscopy for chemical analysis (ESCA) to have a ratio of nitrogen to aryl of at least 0.1, usually at least about 0.15, more usually at least about 0.25 to about 100 Å depth. Preferably the ratio of nitrogen to aryl will be from about 0.25 to 1.

The resulting surface nitrated polyaryl solid substrate has a number of desirable characteristics. Prepared in accordance with the above procedure, the resulting functionalized polymer is clear, so that it can be used for the transmission of light through the polymer without significant interference. Thus, the nitrated polyaryl solid substrate can be used for various applications, particularly where one wishes to transmit light through a sample and have the light traverse the container, so as to determine the amount of light transmitted through the container. Or, one may wish to observe events occurring in the container, such as cell proliferations plaque formation, cell viability, agglutination, etc. For these purposes, the nitro group will usually be modified to provide a more convenient functionality for linking various compounds.

In these applications, one is usually concerned with the effect of irradiation on a sample, where a sample may absorb light, fluoresce, or alternatively, a chemiluminescent reaction may be involved, where the sample will emit light.

The nitro groups are capable of undergoing reactions through intermediate reduced states to provide a nitrilo group such as nitroso, oxime, azoxy, azo, hydrazino or amino, depending upon the particular conditions which are employed. In some instances where the product has two nitrogens, the nitrated surface may be reacted with a second nitro compound, so that a mixed product will be obtained connected by a nitrogen bridge having from one to two nitrogen atoms, or, alternatively, an amino compound may be employed which can react with an intermediate partially reduced functionality, such as nitroso, where the nitroso group may react with the amino group to form an azo group. Of particular interest are the diaza (—N—N—) groups, such as diazo, hydrazone, semicarbazone, hydrazino, etc.

Most of the conventional reagents employed for reducing nitro groups can be employed with the nitrated substrates of the subject invention. These reducing agents include catalytic hydrogen, e.g. with platinum or palladium; stannous chloride; sodium dithionite; metal, e.g. zinc, iron, or tin -acid or -water couples; Al(Hg)-aq. ethanol; aluminum hydrides; borohydrides; ammonium sulfide; sodium arsenite; electrolytic reduction; etc.

Depending upon the nature of the functionality, various reactions may be carried out to link compounds of interest to the solid substrate surface, while still retaining clarity of the solid substrate. The reaction of nitroso groups with amines has already been indicated. Aryl amines are known to undergo a wide variety of reactions. The aryl amines may be acylated under a variety of conditions, using the non-oxo-carbonyl (carboxy carbonyl of functionality) such as acyl halides, anhydrides, active esters, such as paranitrophenyl, N-hydroxy succinimidyl, p-nitro-o-chlorophenyl, etc., or carboxylic acids activated with activating agents such as carbodiimides.

The amino group may be reacted with a nitroso compound to form an azo linkage. Amino halides may be employed to form hydrazines with the amino group. Aldehydes or ketones may be reacted, particularly under reducing conditions, e.g. sodium borohydride, to form imines or alkylated amines, respectively.

Amines-may be diazotized, where the amines may be substituted with a wide variety or functional groups, such as halides, acyl groups, oxy groups, mercapto groups, cyano groups, silyl groups, or the like.

Alternatively, the azo group may-be coupled with an activated aromatic compound, such as a phenolic or a N,N-dialkylaniline compound. Additionally, tyrosinyl compounds may be coupled with diazo groups, where the tyrosine may be part of a larger molecule, such as an oligopeptide or protein. Instead of tyrosine, various purines or pyrimidines may be coupled with the azo group, where the purines or pyrimidines may be monomeric or part of RNA or DNA single stranded or double stranded chains.

Furthermore, the amino group may be functionalized to provide various reactive functionalities, such as isocyanate, urethanes, cyanamides, or the like, where the functionality may be reacted with alcohols, amines, or thiols to form urethanes and ureas.

Instead of amino groups, hydrazino groups may be prepared as indicated, or alternatively by the reduction of the diazo group, where the hydrazino group may also serve as a site for linking. Hydrazino groups can be oxidized with a variety of agents to form diazo groups or with nitrogen oxides to form azido, where the azido group under UV-irradiation forms nitrene. The highly reactive nitrenes will insert into a wide variety of compounds, particularly unsaturated compounds, both aliphatic and aromatic. Thus, aziridines may be formed which may serve as a site for bonding of a compound to the substrate.

Because of the significant interest in coupling peptides to the surface, a number of specific linking groups or spacer arms will be preferred for linking the peptide or other moiety to the surface. One group of linking group reagents will involve carboxyl groups resulting in amide formation. The carboxylic acids will be functionalized with a variety of active functionalities to produce covalent bonds with peptides, as they naturally exist or have been modified to provide a coupling site.

The functionalities for linking include aldehyde, carboxyester, haloacetamido, mercapto, and dithioether. The carboxylic acid group may be further substituted with oxy groups, hydroxy or ether, cyano, substituted amino free of hydrogen atoms, quaternary ammonium, etc. The hydrocarbon chain may be-aliphatic or aromatic.

Specific linking reagents include p-formylbenzoic acid, N-succinimidyl tartarate, mono-hydrazide of tartaric acid, p-iodoacetamidobenzoic acid, 3-mercaptopropionic acid, and 5-α-pyridyl-3-dithio-propionic acid.

Reagents other than carboxylic acids may be employed to provide stable linkages, such as poly(dialdehydes), e.g. polyglutaraldehyde, where the amino group adds by Michael addition, leaving aldehyde and olefin groups for further reaction.

In addition, the amino group may be efficiently diazotized and the resulting diazo group used in a variety of ways. Diazo groups may be substituted with oxy or thio functionalities, to produce functionalities which may be linked to a variety of groups, may be reacted with nucleophilic functionalities such as phenols, anilines, amino, etc, to form a bridge, or may be reduced to a hydrazino or amino group. The bridge may be relatively short or long depending on the purpose for the support.

Illustrative linking groups include bis-p-hydroxybenzamide of diaminopolyethyleneglycol, where one phenolic group is coupled to the diazo group and the other phenolic group may be coupled to nucleic acids or proteins through a Z-di(diazo)benzene or p,p'-di(diazo) biphenyl. The diazo group may be directly coupled to a protein through a tyrosyl group. The phenolic group may be extended with ethylene oxide to provide a linking group, which may terminate in an amino functionality. This bridge may find application in in situ peptide synthesis. The hydrazino group may be coupled, as may an amino group, to a glycol cleaved glycoprotein, to form an imine or Schiff's base, which may be reduced to a methylenehydrazine or -amine. The hydrazine may be coupled with glyoxylic acid, leaving the carboxyl functionality for linking.

The mercapto group may provide a thiol for linking or the diazo group may be substituted by a mercapto group to form a thioether, such as reacting the diazo group with dithioerythritol.

Other bridging or linking groups employing different synthetic scenarios may also be employed. The literature has an extensive variety of reagents and procedures for coupling molecules, such as proteins, lipids, saccharides, nucleic acids and small naturally occurring or synthetic molecules to functionalities on a surface.

The bridging or linking groups may be a single bifunctional group, an oligomer or polymer, such as poly(amino acid), polyurethane, polyurea, polyalkylene oxide, polyester, polyamide, nucleic acid, or the like. In some situations it may be desirable to have a cleavable linkage, so that a bound molecule may be freed from the surface. Linkages may be employed which are cleaved by reduction, oxidation, hydrolysis, or the like, conveniently employing enzymatic catalysis. The linking group may therefore include specific recognition sites for such enzymes as dipeptidases, e.g. KEX1, collagenase, papain, neuraminidase, amylase, other endosaccharidases, endonucleases, phosphatase, pyrophosphatase, where the linkage involves an amide, ether, phosphate ester, or the like. Chemically cleavable bonds include disulfides, peroxides, acetals, azo, carboxylate ester, etc. The cleavable linking group will be selected to avoid the presence of the same or similar cleavable groups present in the moiety to be released.

The subject products, by being coupled to a wide variety of substances, can find extensive applications in diagnosis, therapy, processing, synthesis, and the like. The various groups of interest may be linked directly to the functionality bound to the aryl carbon atom or a spacer or linker arm may be used. The spacers find use where steric hindrance may be of concern, where separation of the group from the solid substrate is of interest, or where the spacing may provide an environment of interest for the group, such as polarity, charge, or the like. Usually, linking groups will be from about 1 to 30 atoms or greater, more usually from about 1 to 20 atoms in the chain and may include, carbon, oxygen, nitrogen, sulfur, phosphorus or the like. The particular choice of spacer or linking arm will depend on the functional groups involved in the linking arm, the properties of interest, synthetic convenience, spacer length, and the like.

As already indicated, a wide variety of molecules having different functions may be linked to the surface, effectively in a monomolecular layer, or polymolecular layer, if desired, and used in a wide variety of applications. The subject techniques provide for a desirable orientation of the molecules bound to the surface, in many situations enhancing their availability for binding and/or manipulation.

The compounds which are linked include ligands, such as haptens and antigens, receptors, such as antibodies, enzymes, naturally occurring receptors, such as surface membrane proteins, lectins, blood proteins, e.g. thyroxine binding globulin, complexing agents, such as cryptands, crown ethers, porphyrins, phthalocyanines, etc., nucleic acids, both RNA or DNA or oligonucleotides, dyes, fluorescers, chemiluminescers, enzymes, where the enzymes are used as catalysts rather than receptors, enzyme substrates, inhibitors or co-factors, or other molecules which may be of interest for detection of the same or different molecules, or used for manipulation, isolation, reaction, interaction, or other phenomena, where a result of interest is produced.

The literature has an extensive repertoire of groups which may be used to link almost any functionality through an amino functionality to a solid surface. U.S. Pat. No. 3,817,837 describes a large number of functionalities which may be used for linking proteins or haptens to amino functionalities, which disclosure is incorporated herein by reference. Other references which show linking to affinity columns, surfaces for apheresis, surfaces for diagnostics, surfaces for chromatography, surfaces for reaction and the like may be found in references cited in such catalogs as the BRL catalog, Bio-Rad catalog, Sigma catalog, Pierce catalog, Pharmacia catalog, etc. It is evident that the particular manner in which the compound of interest is bound to the surface may be varied widely. In particular situations one spacer arm may be selected over another because of particular properties.

The subject solid substrate allows for orientation of immunoglobulins, either as Fab fragments or Fab' fragments, or as intact immunoglobulins. For example, the amino groups of the substrate may be iodoacetylated, followed by reaction with the available mercapto groups of the truncated immunoglobulin. Alternatively, the intact immunoglobulins may be oxidized with a glycol cleaving agent, e.g. periodate, and the resulting dialdehyde reacted with an amino group or hydrazine to form a Schiff base or imine.

Nucleic acids may be linked to the solid substrate using a polyalkylene glycol arm, where the alkylene will be of 2 to 3 carbon atoms, and the chain may be of from 2 to 100, usually 2 to 30 alkyleneoxy units. The linking group can be achieved by using the diazo functionality on the solid substrate with a diacylated c,w-diaminopolyethylene glycol, e.g. m-dimethylaminobenzoyl derivative or diaminopolyethylene glycol. The dimethylamino activated aroyl group may be used as a site for linkage, where one will become covalently bonded to the diazo group, leaving the other to be used for linking to another compound. In this manner, phenylenediamine, benzidine, or other aryl diamino compound may be diazotized to form a link between the dimethyiaminoaroyl and a nucleic acid. The use of the diazo group for linking nucleic acids to the surface has already been discussed.

The applications of the subject invention will now be considered. The first use to be considered will be diagnostics. Diagnostics involving solid surfaces are for the most part referred to as heterogeneous in that they involve a separation step, though there is an increasing number of diagnostic protocols where a solid surface is Involved without the necessity for a separation step. In diagnostics, there may be of interest the binding of members of a specific binding pair, comprising ligand and receptor, which bind to form a complex, where the homologous members of the specific binding pair have a high association constant for each other, usually greater than $10^8$ l/mol.

The haptens will generally be from about 150 to 5000 daltons, usually up to about 2000 daltons and may include naturally occurring hormones, naturally occurring drugs, synthetic drugs, pollutants, affector molecules, growth factors, lymphokines, amino acids, oligopeptides, chemical intermediates, nucleotides, oligonucleotides or the like. Diagnostics for such compounds may be in the detection of drugs of abuse, therapeutic dosage monitoring, health status, detection of diseased e.g. endotoxins, and the like; Proteins are or interest in a wide variety of diagnostics, such as detecting cell populations, blood type, pathogens, immune responses to pathogens, immune complexes, saccharides, naturally occurring receptors, and the like. Receptors may rind use in binding to haptens, proteins, other receptors, or the like, or detection of the presence or pathogens, the level of a particular protein in a physiological fluid, the presence of haptens in a wide variety of samples, such as physiological fluids, air, process streams, water, etc. Nucleic acids may also find use in the detection or proteins specifically binding to nucleic acids, complementary strands, and the like.

Of particular interest is the binding of microorganisms and cells, including viruses, prokaryotic and eukaryotic cells, unicellular and polycellular organism cells, e.g., fungi, animal, mammal, etc., or fragments thereof. Usually, these large aggregations will be non-covalently bound to the surface through specific binding pair member complexes. By having a high density of binding members bound to the surface, a cell or virus may be complexed by a large number of binding pair members, providing very strong anchoring of the cell, virus, or fragment. The system may then be subjected to vigorous treatment without concern for dislodging the specifically bound entity, while nonspecifically bound materials may be readily removed.

A large number of protocols exist for detecting the various analytes of interest. The protocols may involve use of a signal producing system, which involves a labeled conjugate, which may be directly or indirectly detected. These techniques may employ dyes, enzymes, enzyme substrates or co-factors, enzyme inhibitors, fluorescers, chemiluminescers, particles, or the like.

For the purposes of the present invention, the label should provide a signal related to the presence of analyte in the sample which results in the detection of electromagnetic radiation, particularly light in the ultra-violet, visible or infrared range. By use of the subject solid substrate, the light may be detected through the solid substrate, rather than requiring reflection, which is normally subject to significant error. In addition, techniques involving total internal reflection may be employed as described in U.S. Pat. No. 3,939,350. Other patents of interest, both domestic and foreign, which describe protocols of interest include U.S. Pat. Nos. 3,654,090, 3,850,752, 4,347,312, EPA 2,963, and references cited therein.

Assays can be carried out in accordance with the various protocols. In accordance with the subject invention, the sample is contacted with the subject solid substrate and various operations may be carried out, such as the addition of various reagents, incubations, washings, and the like. The final result of the assays will be the change in the amount of a product which absorbs or produces light, either by light absorption or by light emission in relation to the presence or amount of the analyte of interest. Usually, this is as a result of formation of a specific binding complex between complementary members of a specific binding pair, where one of the members may serve as a bridge to form a sandwich, or there may be a single complex, or complexes may be bound to complex binding proteins, such as *S. aureus* protein A, rheumatoid factor, immunoglobulins specific for immune complexes, or the like.

By having fluorescent markers, such as fluorescent particles, fluorescent conjugated antibodies, or the like, the sample may be irradiated with light absorbed by the fluorescers and the emitted light measured. For example, where one has microtiter wells, one can measure the fluorescent light emitted through the sides of the well, substantially minimizing the background resulting from the activating light. Where dyes are employed as the label or produced as a result of a reaction, e.g. an enzymatically catalyzed reaction, the light may be transmitted through the sample and the container and measured as an indication or the presence of the analyte, since there is a relatively low level of absorption by the container. Thus, highly sensitive assays can be employed with the subject system.

Similarly, with nucleic acid assays involving hybridization, one can carry out the necessary steps to determine whether complementary sequences are present, and by employing a wide variety of protocols, provide for a colored or fluorescent label or product of the label, which will indicate the presence or absence of the complementary sequence.

For example, one could activate the surface immediately prior to carrying out the assay by diazotizing the amino functionalities, add the nucleic acid sample to the activated surface, so as to be covalently bound, and then employ probes having a sequence complementary to the sequence of interest and functionalized, for example, by having a biotin label. After completion of the hybridization step, one could add enzyme conjugated to avidin, which would bind to any biotin bound to the surface through hybridization. After washing away non-specifically bound avidin, the substrate for the enzyme could be added and the formation of product would be indicative of the presence and amount of the complementary sequence.

The subject containers may also be used for detecting pathogens. Monoclonal antibodies may be linked to the surface to serve as catching antibodies. The sample would then be added and cells having the epitope recognized by the antibody would bind to the antibody on the surface. Non-specifically bound cells are washed away leaving substantially only specifically bound cells. Labeled monoclonal antibodies are then added to the container which are specific for an epitope other than the epitope recognized by the catching antibody. After incubating to allow reaction between the antibodies and cells, non-specifically bound antibodies are washed away and the presence of the label determined, as described previously.

A variation would be to employ an antigen recognized by a cell receptor. The antigen would be bound to the surface to catch the cells and a labeled antigen used to label the cells. The receptor could be surface immunoglobulin (sIg). In this way the presence of the specifically bound cells could be determined, whereby having the antigen of interest complementary to the receptor bound to the surface, cells having the sIg specific for such antigen could be determined. Instead of having antigen, one would have antibodies to the antigen bound to the surface to non-covalently bind the antigen to the surface.

The subject solid substrates can also be used for affinity columns, chromatographs, or the like, where a particular substance is bound to the surface and complex formation or other binding event can be detected. With the subject solid substrates, one can visually observe along the length of a column and determine the particular site at which complex formation occurs. This technique can also be used for diagnosis, where different antigens or receptors may be bound at different sites along the column, followed by introducing the sample through the column, followed by adding the signal producing system, e.g. enzyme bound specific binding pair member and developer, and detecting the areas of color formation.

The subject solid substrates may also find use in isolating various products of interest, such as blood plasma proteins, growth factors, clotting factors, anti-clotting factors, or the like, which may then be released from the complex by various salt solutions.

The solid substrates may be used for a variety of other purposes, whenever one wishes to provide a high density of oriented molecules at a surface or visualize events or provide for ready transmission of light, where a substance is non-diffusively bound to a solid surface.

The following examples are offered by way of illustration and not by way of limitation.

EXPERIMENTAL

Into the wells of a 96 well microtiter plate of molded polystyrene is introduced a 0.5 M nitro tetrafluoroborate solution in tetramethylenesulfone (TMS) and the reaction allowed to proceed at 37° C. for 6 hrs. At the and of this time, the reaction mix Is discarded and the wells washed with methanol. Into the plates is then introduced a 1 M solution of stannous chloride in 6 N aqueous hydrochloric acid and the reaction allowed to proceed at room temperature for 2 hrs to reduce the nitro groups to amino groups. The resulting amino groups are diazotized by adding a 1% sodium nitrite solution in 1 N aqueous hydrochloric acid at 4° C. and allowing the reaction to proceed for 20 min, after which time the reaction mixture is washed away and a solution of a protein containing tyrosine is added at 0.1, 1.0, or 10 mg/ml in 0.1 M borate pH 9.3 at 4° C. The reaction is allowed to proceed for 16 hrs, whereby the protein becomes covalently bonded to the surface.

The above reaction procedure was repeated whereby water was included in the nitration medium at a concentration of 0.5 M, in equimolar concentration to the nitronium ion.

In order to evaluate the number of functionalities introduced, electron spectroscopy for chemical analysis was employed. Instead of covalently linking a protein by means of a tyrosine, the dye 3,6-disulfonatonaphthol-1 was employed. In this analysis, the surface is irradiated with soft X-rays where ejected electrons are a function of the kind of atom hit by the X-ray. The number of electrons of a given energy reflects the number of atoms of a given type. The following table indicates the results.

TABLE 1

ESCA ANALYSIS OF CHEMICALLY MODIFIED
MOLDED POLYSTYRENE SURFACE (100Å DEPTH)

NUMBER OF ATOMS

| | CARBON | | | FACTOR | OXYGEN | | | | NITROGEN | | | SULFUR |
|---|---|---|---|---|---|---|---|---|---|---|---|---|
| | TOTAL | STYRYL | DYE | $\left(\frac{80}{\text{STYR C}}\right)$ | TOTAL | NITRO | DYE | OTHER | NITRO | AMINE | AZO | |
| —NO$_2$ | 67.1 | 67.1 | — | 1.192 | 23 | 23 | — | — | 10 | — | — | — |
| —NH$_3$ | 78 | 78 | — | 1.026 | 7.2 | 7.2 | — | — | 3.6 | 11 | — | — |
| —DYE | 67.6 | (48.8) | (19.2) | 1.653 | 22.6 | (1.2) | (13.5) | (7.9) | 0.6 | — | 3.2 | 4.5 |

AVE 3.85

NUMBER OF ATOMS RELATIVE TO 8 STYRYL C ATOMS

TABLE 1-continued

ESCA ANALYSIS OF CHEMICALLY MODIFIED
MOLDED POLYSTYRENE SURFACE (100Å DEPTH)

| | TOTAL | STYRYL | DYE | | TOTAL | NITRO | DYE | OTHER | | NITRO | AMINE | AZO | |
|---|---|---|---|---|---|---|---|---|---|---|---|---|---|
| ⌇—NO$_2$ | 8.0 | 8.0 | — | | 2.7 | 2.7 | — | — | | 1.2 | — | — | — |
| ⌇—NH$_3$ | 8.0 | 8.0 | — | | .73 | .73 | — | — | | .37 | 1.1 (75%) | — | — |
| ⌇—DYE | 11.2 | 8.0 | 3.2 | | 3.7 | .20 | 2.2 | 1.3 | | 0.10 | — | 53 (20%) | 7.4 |

DYE = [naphthalene structure with OH, two SO$_3^-$ groups, Na]   $C_{10}O_7N_2S_2$ In the next study, binding of $^{35}$S-methionine-labeled avidin to activated T-25 flasks is demonstrated.

A. [$^{35}$S-met]-labeled avidin t-boc-[$^{35}$S-Meth-ionine]-N-succinimidyl ester (Amersham), 830 Ci/mmole) was used to label the ε-amino groups of lysine residues of avidin employing the reaction conditions of the supplier. The labeled avidin was diluted into a 10 mg/ml solution of avidin (Sigma) in 0.1 M borate buffer, pH 9.3, to give a final specific activity of 428 dpm/µg.

B. Diazotization of T-25 flask containing surface aniline groups and covalent attachment of [$^{35}$S-met]-labeled avidin.

25 flasks were nitrated with 5 ml 0.5 M nitrotetrafluoroborate in the presence or absence of 0.5 M water in TMS at $_{37}$° for 16 hrs. After decanting reaction medium and thorough washing with distilled water, 5 ml of 1 M stannous chloride in 6 N HCl was added and the reaction allowed to proceed for 2 hrs at room temperature. The flasks were washed with 0.04 N HCl to provide the amino functionalized surface.

The amino groups were then diazotized by addition-of 5 ml 2% sodium nitrite in cold (4° C.) 1 N HCl, followed by gentle agitation on a platform-rotator at 4° C. for 20 min. The resulting diazonium functionalized flasks were rinsed with cold 0.01 N HCl and 2.5 ml cold mg/ml [$^{35}$S-met]-labeled avidin in 0.1 M borate buffer, pH 9.3 was added. After gently agitating for 16 hrs at 4° C., the flask contents were aspirated, the flasks rinsed with 0.1 M borate buffer at room temperature until the total counts in the wash were below 2000 dpm. Approximately 3 of 4 sub-units of the bound avidin were removed by treatment with 2.5 ml 6% sodium dodecyl sulfate (SDS)/0.1 M dithiothreitol (DTT) for 48 hrs at room temperature. Based on the dpm recovered in the SDS/DTT eluate and the specific activity of the [$^{35}$S-met]-labeled avidin, the amount of avidin covalently bound to the activated T-25 flask was calculated. The following table indicates the results.

TABLE 2

QUANTITATION OF $^{35}$S-AVIDIN IMMOBILIZATION
ON ACTIVATED POLYSTYRENE SURFACE

| ACTIVATION | H$_2$O MOLARITY IN NITRATION R × N | AVE DPM PER 25 CM$^2$ FLASK | µG $^{35}$S-AVIDIN BOUND[1] PER 25 CM$^2$ FLASK |
|---|---|---|---|
| DIAZONIUM | 0 | 33,617 / 31,423 } 32,520 | 76 |
| DIAZONIUM | 0.5 | 167,417 / 187,908 } 177,660 | 420 |
| POLYMERIZED GLUTARALDEHYDE[2] | 0.5 | 273,637 | 640 |

[1]NONCOVALENTLY BOUND SUBUNITS OF TETRAMERIC $^{35}$S-AVIDIN WERE RELEASED BY 16 HOUR TREATMENT WITH 6% SDS/0.1M DDT.
ONE AVIDIN MOLECULE COVERS ABOUT 4000 Å$^2$ = 4 × 10$^{-13}$ CM$^2$

TABLE 2-continued

QUANTITATION OF $^{35}$S-AVIDIN IMMOBILIZATION ON ACTIVATED POLYSTYRENE SURFACE

| ACTIVATION | $H_2O$ MOLARITY IN NITRATION R × N | AVE DPM PER 25 CM$^2$ FLASK | $\mu$G $^{35}$S-AVIDIN BOUND[1] PER 25 CM$^2$ FLASK |
|---|---|---|---|

$$\frac{4 \times 10^{-13} CM^2}{AVIDIN\,MOLECULE} = \frac{0.241\,CM^2}{PMOLE} \Rightarrow \frac{4.15\,PMOLES}{CM^2}$$

$$= \frac{6.5\,\mu G}{25\,CM^2}\ LINEAR\,SURFACE\,AREA$$

[2] 
$$H-C=O \qquad HC=O \qquad HC=O$$
$$\quad\ \ \ \diagdown \qquad\qquad\quad / \qquad\qquad /$$
$$\quad CH_2-(CH_2-CH_2-CH=C)_N-CH_2-CH_2$$

In the next study polyglutaraldehyde was employed as the bridging group.

Polyglutaraldehyde (PG) was prepared according to the procedure of Rembaum et al., *J. Immun. Methods* (1978) 24:239. The product was vacuum dried at 90° to complete dehydration and remove residual monomeric glutaraldehyde. The dried PG was dissolved in dry TMS at 37° to give a 10 mg/ml solution. Into T-25 amine functionalized flasks was introduced 5 ml of the TMS solution and the flasks incubated at 37° for 16 hrs. After rinsing with warm TMS and distilled water, 2.5 ml of [$^{35}$S-met]-labeled avidin in 0.1 M borate buffer, pH 9.3, was added and the flasks incubated for 16 hrs at room temperature. After thorough washing with 0.1 M borate buffer, pH 9.3, [$^{35}$S-met]-labeled avidin subunits were released with 6% SDS/0.1 M DTT as previously described and the radioactivity counted. The calculated amount of bound avidin in the PG-treated flask appears in the above table.

The above experiment was repeated using [$^{35}$S-methionine] in place of the avidin. The polyglutaraldehyde derivitized flasks were incubated with 5 ml of 0.1 M [$^{35}$S]-methionine and 283 dpm/mmole prepared from [$^{35}$S-methionine (Amersham), 1250 Ci/mmole] diluted in cold 0.1 M methionine in 0.1 M NaHCl$_3$ at 37° for 16 hrs. After washing with 0.5 M MaCl, the flasks were rinsed with distilled water, dried and broken. Flask bottom pieces were recovered, weighed, and counted. From the known weight of the flask bottom (3.2 g/25 cm$^2$), the specific activity of the [$^{35}$S-methionine] and the counts recovered, the amount of methionine covalently attached to the flask bottom was calculated to be 43 nmoles/cm$^2$.

The next study involved the use of Immulon2 plates (Dynatech).

A solution of nitronium tetrafluoroborate (Fluka, 0.5 M) in tetramethylenesulfone (TMS, Phillips) was prepared and made to 0.9% $H_2O$. The solution was added to the 96-well Dynatech Immulon2 plates via a Transtar 96 (Costar) delivery system inside of a glove box equipped with a Drierite drying column and circulating blower. For each well of the plate, 100 $\mu$l of the TMS solution was addled, and the plate was sealed with an adhesive-backed cellulose acetate cover (Dyna-tech) and incubated at 37° C. for 6 hrs with gentle shaking. After incubation, the plate seal was removed and the nitrating solution drained, followed by washing with copious amounts of $H_2O$.

The previously prepared nitrated plate was shaken dry, and to each well was added 200 $\mu$l of 1.0 M SnCl$_2$ in 6 N HCl. The plate was shaken for 2 hrs at room temperature and washed with copious amounts of $H_2O$. The plates could be stored at 4° C. over 0.2 N HCl (200 $\mu$l/well) or used directly after the $H_2O$ wash.

The derivatized amine plate was shaken dry and cooled to 4° C. A solution of 2% NaNO in 1 N HCl was prepared at 4° C. (noxious odors produced), and 200 $\mu$l of this solution was added to the 96-well plates. After shaking at 4° C. for 30 mn, the plate was shaken dry, rinsed with cold (4° C.) 0.01 N HCl, and treated with various protein coating solutions.

$^{35}$S-labeled human IgG (Sigma) in 0.1 M borate (Na$^+$), pH=9.2, was prepared in dilutions of 10, 1.0, 0.1 and 0.01 mg/ml. The 1.0, 0.1 and 0.01 mg/ml solutions were also prepared with 0.2% Tween 20 present. The previously described derivatized diazonium plate was treated immediately after preparation with the protein solutions at 4° C. In exactly the same manner, an underivatized Immulon2 plate was also coated at 4° C. After incubation for 96 hrs, the excess coating solution was removed from the plates and the wells were rinsed with PBS (7×15 ml) over the course of 48 hrs at 4° C. The wells were then placed in scintillation fluid and counted. The following Table 3 provides the results.

TABLE 3

$^{35}$S-LABELED HUMAN IqG BINDING TO DYNATECH IMMULON 2 AND DIAZOTIZED IMMULON 2 MICROTITER PLATES
SURFACE DENSITY = $\mu$g/cm$^{2a}$

| | DIAZONIUM | | POLYSTYRENE | |
|---|---|---|---|---|
| COATING CONC. | c 0.2% TWEEN (CV) | NO TWEEN (CV) | c 0.2% TWEEN (CV) | NO TWEEN (CV) |
| 10 mg/mL | n.d. | 23.6 (7.8) | n.d. | 2.08 (5.9) |
| 1 mg/mL | 2.47 (2.0) | 4.31 (5.3) | 0.08 (43.) | 0.46 (9.0) |

TABLE 3-continued $^{35}$S-LABELED HUMAN IgG BINDING TO DYNATECH
IMMULON 2 AND DIAZOTIZED IMMULON 2 MICROTITER PLATES
SURFACE DENSITY = $\mu$g/cm$^{2a}$

| | DIAZONIUM | | POLYSTYRENE | |
|---|---|---|---|---|
| COATING CONC. | c 0.2% TWEEN (CV) | NO TWEEN (CV) | c 0.2% TWEEN (CV) | NO TWEEN (CV) |
| 0.1 mg/mL | 0.50 (3.5) | 0.81 (10.4) | 0.01 (8.3) | 0.35 (6.0) |
| 0.01 mg/mL | 0.12 (5.6) | 0.28 (2.3) | 0.01 (44.) | 0.18 (6.0) |

$^a$SURFACE AREA IN MICROTITER WELL IS 1.264 CM$^2$

The next study involved the binding of an immunoglobulin to an amino-functionalized polystyrene surface through the use of hydrazone links.

Following the procedure of O'Shannessy et al., *Immunol. Lett.* (1985) 8:273–277, a 2 mg/ml solution of IgG (mono- or polyclonal) in 0.1 M acetate (Na$^+$), pH=5.5, was cooled to 4° C. The solution was treated with an appropriate amount of 0.25 M NaIO$_4$ in H$_2$O to bring the total IO$_4^-$ concentration to 10 mM, and the solution was gently shaken at 4° C. for 1 hr. The crude product was purified by a G-10 spun column (0.1 M acetate, pH=5.5) (10 ml bed volume/1 ml reaction mixture). The void volume typically contains 70% of the original protein in the same volume. The aldehyde solutions were used immediately to avoid oxidation to the acid.

To the oxidized IgG solution described above was added sufficient tartaric dihydrazide (Lutter et al., *FEBS Lett.* (1974) 48:288–292) to bring the concentration to 0.5 M in tartaric dihydrazide. After 30 min with shaking, the solution became clear. The reaction was stopped after 2 hrs by passing the solution through a G-10 spin column (0.1 M acetate, pH=5.5) (10 ml bed volume/1 ml reaction mixture) followed by dialysis at 4° C. (0.1 M acetate, pH=5.5, 1 L for 8 hrs and 2 L for 8 hrs). Final purification was achieved with a G-10 spin column (0.1 M acetate, pH=5.5) (10 ml bed volume/1 ml dialyzed solution). The void volume was found to contain 50% of the original oxidized protein with a slightly greater volume. The solution was diluted to 0.1 mg/ml (A$^{280}$=0.160) and used to coat the aldehyde surface (see below).

A solution of 0.25 terephthalaldehyde in glacial acetic acid was exposed to an aminopolystyrene surface (0.15 ml/cm$^2$) prepared as described above. The reaction proceeded for 2 hrs at room temperature. The solution was then removed and the surface washed with absolute ethanol (1 ml/cm$^2$) for 15 min, a total of 6 times. The surface gave a positive Schiff test. After rinsing once with buffer (1 ml/cm$^2$, 0.1 M acetate, pH=5.5) the surface was treated immediately with the IgG hydrazide.

The IgG hydrazide (0.1 mg/ml, 0.1 M acetate, pH=5.5) was coated onto the previously prepared aldehyde surface (0.10 ml/cm$^2$) by gentle shaking or rolling for 14 hrs at room temperature. Depletion of the protein could be monitored by reduction of the 224 nm absorbance of the IgG hydrazide. The surface was rinsed with PBS 5 times (1 ml/cm$^2$) and stored at 40° C. until needed.

Alternative Procedure

A 0.5 M solution of tartaric dihydrazide in 10% aqueous acetic acid was coated onto the previously prepared aldehyde surface (0.15 ml/cm$^2$) for 2 hrs at room temperature. The solution was drained off and the surface washed with copious amounts of H$_2$O.

A 0.1 mg/ml solution of oxidized IgG in 0.1 M acetate, pH=5.5, was coated onto the previously prepared aldehyde/hydrazide surface (0.10 ml/cm$^2$) by incubating with gentle shaking at room temperature for 18 hrs. The solution was drained and the surface washed with PBS 5 times (1 ml/cm$^2$) and stored at 4° C. until needed.

In the next study, polystyrene beads were functionalized with immunoglobulin.

Following the previously described procedure, polystyrene beads (¼ and ⅛ inch diameter, specular finish) were amine functionalized. A portion of the beads were diazotized and 3 groups of beads, untreated, amine functionalized, and diazotized, were incubated for 16 hr at 4° C. with 10 mg/ml [$^{35}$S-met]-labeled human IgG [$^{35}$S-IgG] in 0.1 M borate buffer, pH 9.2. After the reaction, the [$^{35}$S-IgG]-labeled beads were washed exhaustively at 4° C. with 0.1 M borate buffer, pH 9.2, containing 0.5 M NaCl. Washing was continued until the total wash counts per 2 hrs wash dropped below 200 dpm for untreated beads and 2000 dpm for diazotized beads. The amount of [$^{35}$S-IgG], specific activity 1.48 dpm/mg was determined by counting the beads directly in Opti-Fluor (Packard). Results are shown in the following table.

TABLE 4

Binding Of $^{35}$S-IgG to Activated Polystyrene Beads

| | Untreated | | Amine | | Diazonium | |
|---|---|---|---|---|---|---|
| | ¼ in. | ⅛ in. | ¼ in. | ⅛ in. | ¼ in. | ⅛ in. |
| dpm × 10$^{-3}$/bead | 3.640 | 0.7905 | 6.165 | 1.309 | 405.2 | 93.40 |
| Area/bead (cm$^2$) | 1.267 | 0.3167 | 1.267 | 0.3167 | 1.267 | 0.3167 |
| Density ($\mu$g/cm$^2$) | 1.94 | 1.69 | 3.29 | 2.79 | 216 | 199 |
| Denity Ratio | 1.00 | 1.00 | 1.70 | 1.65 | 111 | 118 |

In the next study, antibodies were bound to amine functionalized T-25 flasks providing for high levels of available binding sites.

In a T-25 flask was combined 50 mg of p-formylbenzoic acid (FBA) and 450 mg of tosylate N-cy-clohexyl, N'-(N"-methyl morpholino-2-ethyl) carbodiimide in 10 ml of TMS and the mixture sonicated for 30 min. The FBA functionalized flasks were contacted with succinic acid dihydrazide (0.2 M) in glacial acetic acid for 2 hrs at room temperature on a platform rocker. The flasks were then washed 5 times with distilled water, 3 times with 0.1 M borate buffer, pH 9.2, 3 times with distilled water, 3 times with isopropanol, and 3 times with distilled water. The flasks were stored at room temperature with acetate buffer (0.1 M, pH 5.5) until used.

Ant4-Leu-1 monoclonal antibody was oxidized as described above and conjugated to form the hydrazone as described above. The resulting anti-Leu-1 conjugated flasks were then used in the following study.

Monocyte-depleted peripheral blood lymphocytes (PBL) were prepared from human blood as follows. Buffy coat cells were added to 75 ml HBSS-E (Hank's Balanced Salt Solution with 1 mM EDTA) and mixed well. The blood-HBSS-E solution was then divided into 4 aliquots and placed into 50 cc clinical centrifuge tubes. The solution was underlayered with approximately 14 ml of pre-warmed Histopaque. The cells were centrifuged at 1500 rpm (J6B6 centrifuge) for 30 min at room temperature. The interface layer was harvested and the cells washed once with HBSS-E. After centrifugation at 1000 rpm for 10 min at room temperature the supernatant was aspirated and the cells cooled. The cells were then washed 2 more times then re-suspended in HBSS-CMF (Hank's-calcium and magnesium free) plus 1% serum without EDTA then transferred to T-75 flasks. The flasks were incubated on their sides for 30 min at 37° C. to allow monocytes to adhere to the surface. After 30 min, non-adherent cells were removed by gently swirling the contents of the flasks. The flasks were washed twice with HBSS-CMF and the non-adherent cells collected by centrifugation at 1000 rpm for 10 min at room temperature. The cells were then re-suspended in HBSS-E containing 1% serum. The cells were then seeded into T-25 flasks, $2.5 \times 10^7$ cells per flask. The flasks were incubated on their sides for 1 to 2 hours at room temperature with gentle swirling of the cell suspension at 20 to 30 min intervals. At the end of the incubation period the non-adherent cell suspension was removed and the flask washed 3 times with HBSS-E to remove remaining non-adherent cells.

After incubating at room temperature for 1.5 hrs with the anti-Leu-1 surface prepared as described above, with mixing every 20 min., non-adherent cells were recovered for staining. Adherent cells were counted. $25 \times 10^6$ cells were introduced with 99% viability. $20 \times 10^6$ cells were bound to the flasks. The non-adherent cells were analyzed by fluorescence activated cell sorting (FACS) which showed a 98.7% and 95% depletion respectively of Leu-1 and Leu-4-positive cells. After 4 mM magnesium chloride elution some of the flasks were reused with $20 \times 10^6$ PBL (monocyte-depleted). 99%.and 91% depletion of Leu-1 and Leu-4 positive cells was achieved.

It is evident from the above results that the subject invention provides a substantial improvement over previously available solid substrates, particularly as containers, slides, beads, wells, or the like. In accordance with this invention, high concentrations of substances can be applied to the surface-in a non-diffusive manner to insure the retention of the substances at the surface. Thus, small volumes may be employed for high efficiency and sensitivity in determining or isolating a wide variety of compounds of interest. The amino functionality is a very versatile functionality, so that relatively easy procedures may be developed for linking various functionalities to the surface, either directly or through a spacer arm. By. virtue of being able to achieve high clarity, reactions can be observed, cell growth can be observed, and can be transmitted through the surface and be measured, providing for greater efficiency and sensitivity. In addition, desirable orientations of ligands and receptors can be-achieved to provide for high levels of epitopes and binding sites.

It is evident from the above results, that the subject invention provides for substantially improved solid substrates for use in a wide variety of applications. A high proportion of the available aryl groups present on the surface may be functionalized, so that a large number of moieties of interest may be joined to the surface, either covalently or non-covalently, to provide solid surfaces with a high degree of functionalization. In this manner, a variety of processes, diagnostic, therapeutic, processing, or the like may be carried out with greater efficiency, using smaller volumes, and having improved results.

Although the foregoing invention has been described in some detail by way of illustration and example for purposes of clarity of understanding, it will be obvious that certain changes and modifications may be practiced within the scope of the appended claims.

What is claimed is:

1. An article comprising a surface functionalized polyaryl addition polymer having at least about 5% of the aryl groups in said polyaryl addition polymer to a depth of 100 Å, as determined by ESCA substituted with a functionalized nitrogen-containing group, with the remaining aryl groups substantially unsubstituted with said functionalized nitrogen-containing group.

2. An article according to claim 1, wherein the ratio of substituted aryl groups to unsubstituted aryl groups to a depth of 100 Å is in the range of 0.25 to 1.

3. An article according to claim 1, wherein said polyaryl addition polymer is polystyrene.

4. The article of claim 1 wherein said functionalized nitrogen-containing group is an acylated amine.

5. The article of claim 1 wherein said functionalized nitrogen-containing group is an amino group functionalized to provide a reactive functionality.

6. The article of claim 4 wherein the acyl group of the acylated amine is functionalized so as to be able to produce covalent bonds with peptides.

7. The article of claim 1 which is a bead.

* * * * *